(12) United States Patent
Lanser et al.

(10) Patent No.: US 7,325,854 B2
(45) Date of Patent: Feb. 5, 2008

(54) VISOR FOR VEHICLES

(75) Inventors: Michael L. Lanser, Holland, MI (US); David L. Hiemstra, Hudsonville, MI (US)

(73) Assignee: Innotec Corporation, Zeeland, MI (US)

( * ) Notice: Subject to any disclaimer, the term of this patent is extended or adjusted under 35 U.S.C. 154(b) by 16 days.

(21) Appl. No.: 11/415,778

(22) Filed: May 2, 2006

(65) Prior Publication Data
US 2006/0261628 A1    Nov. 23, 2006

Related U.S. Application Data

(60) Provisional application No. 60/676,819, filed on May 2, 2005.

(51) Int. Cl.
*B60J 3/00* (2006.01)
(52) U.S. Cl. .................................................. 296/97.9
(58) Field of Classification Search ............... 296/97.9, 296/97.12; 248/289.11, 290.1, 291.1; 362/492
See application file for complete search history.

(56) References Cited

U.S. PATENT DOCUMENTS

| | | | |
|---|---|---|---|
| 4,729,590 A * | 3/1988 | Adams | 296/97.13 |
| 4,989,911 A * | 2/1991 | Van Order | 296/97.9 |
| 5,031,954 A | 7/1991 | Peterson et al. | |
| 5,061,005 A * | 10/1991 | Van Order et al. | 296/97.9 |
| 5,082,322 A * | 1/1992 | Cekander et al. | 296/97.9 |
| 5,098,151 A | 3/1992 | Peterson | |
| 5,201,564 A * | 4/1993 | Price | 296/97.9 |
| 5,544,927 A | 8/1996 | Snyder et al. | |
| 5,752,853 A | 5/1998 | Curtindale | |
| 5,765,897 A | 6/1998 | Snyder et al. | |
| 6,547,308 B2 | 4/2003 | Hamelink et al. | |

FOREIGN PATENT DOCUMENTS

DE        3820334 C1 * 12/1989  ............... 296/97.12

* cited by examiner

*Primary Examiner*—Dennis H. Pedder
*Assistant Examiner*—Paul Chenevert
(74) *Attorney, Agent, or Firm*—Price Heneveld Cooper Dewitt & Litton, LLP (57) ABSTRACT

A mounting arrangement for mounting a visor to a vehicle includes a bracket assembly that does not require use of threaded fasteners or the like. The bracket assembly includes a housing, a bracket member, and a foot member. The foot member includes tapered extensions that engage an upper side of the roof panel to retain the bracket assembly to the roof panel.

21 Claims, 10 Drawing Sheets

VISOR FOR VEHICLES

CROSS-REFERENCE TO RELATED APPLICATIONS

This application claims the benefit of U.S. Provisional Application No. 60/676,819, filed on May 2, 2005, entitled VISOR FOR VEHICLES, the entire contents of which are incorporated by reference.

BACKGROUND OF THE INVENTION

Various types of visors have been developed for vehicles such as cars, trucks, and the like. Visors are typically mounted to the vehicle's roof adjacent the roof pillar that extends between the windshield and the front windows of the vehicle. The sun visor may include a support arm or elbow that can be pivoted to position the sun visor adjacent the windshield or adjacent the side window. Also, the visor body may translate and/or rotate about the support arm to provide additional adjustability.

Various methods of mounting the visor to the vehicle have been devised. However, known mounting arrangements typically utilize threaded fasteners or the like, contributing to the cost of fabrication and assembly.

Accordingly, a visor mounting arrangement alleviating the drawbacks of existing arrangements would be beneficial.

SUMMARY OF THE INVENTION

One aspect of the present invention is a visor for vehicles including a visor body and a support member extending from the visor body. The support member includes a generally horizontal portion and a generally vertical portion. The horizontal and vertical portions together define an L-shaped portion. The visor also includes a bracket having an opening therethrough. The vertical portion of the support member extends through the opening in the bracket. The visor further includes a housing having a main body portion engaging the vertical portion of the support member. The housing includes a first transversely extending portion configured to engage an upper side of a sheet of material to which the visor is to be attached. The housing further includes a second transversely extending portion configured to engage a lower side of a sheet of material to which the visor is to be attached. A foot member has an upper end engaging the housing, and a retaining structure configured to engage an upper side of a sheet of material to which the visor is to be attached. A spring engages the support member and biases the support member upwardly. The spring also engages the foot member and biases the foot member downward such that the housing is biased towards the bracket.

Another aspect of the present invention is a vehicle of the type having a sheet of metal forming an interior roof and a visor that is mounted to an opening in the sheet of material, wherein the improvement includes a visor body and a support member extending from the visor body. A mounting bracket assembly including an upper member configured to engage an upper surface of the sheet of material adjacent the opening, and a lower member that is resiliently biased towards the upper member to capture a portion of the sheet of material between the upper member and the lower member. The bracket assembly retains the support member and visor body to the interior roof.

Yet another aspect of the present invention is a method of attaching a visor to a vehicle interior panel having an opening therethrough and defining inner and outer surfaces. The method includes providing a visor having a body and a support member extending from the body. A bracket member having an opening therethrough is also provided. A housing member having a body portion defining a cavity and a finger extending from the body portion is also provided, as is a foot member having an upper portion and a lower portion configured to extend around the support member. A coil spring is provided, as is a clip configured to engage the support member. The method further includes inserting the support member through the opening in the bracket member. The foot member is positioned adjacent the bracket member with the lower portion of the foot member extending around the support member. The coil spring is positioned around the support member with an end of the spring engaging the lower portion of the foot member. The clip is positioned on the support member to retain the coil spring between the clip and the lower portion of the foot member. The body portion of the housing is positioned adjacent the bracket member with the upper portion of the foot member in the cavity. The finger of the housing is inserted into the opening in the vehicle interior panel, and the housing is shifted to insert the body portion of the housing into the opening in the vehicle interior panel and position the finger at the inner surface of the interior panel.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
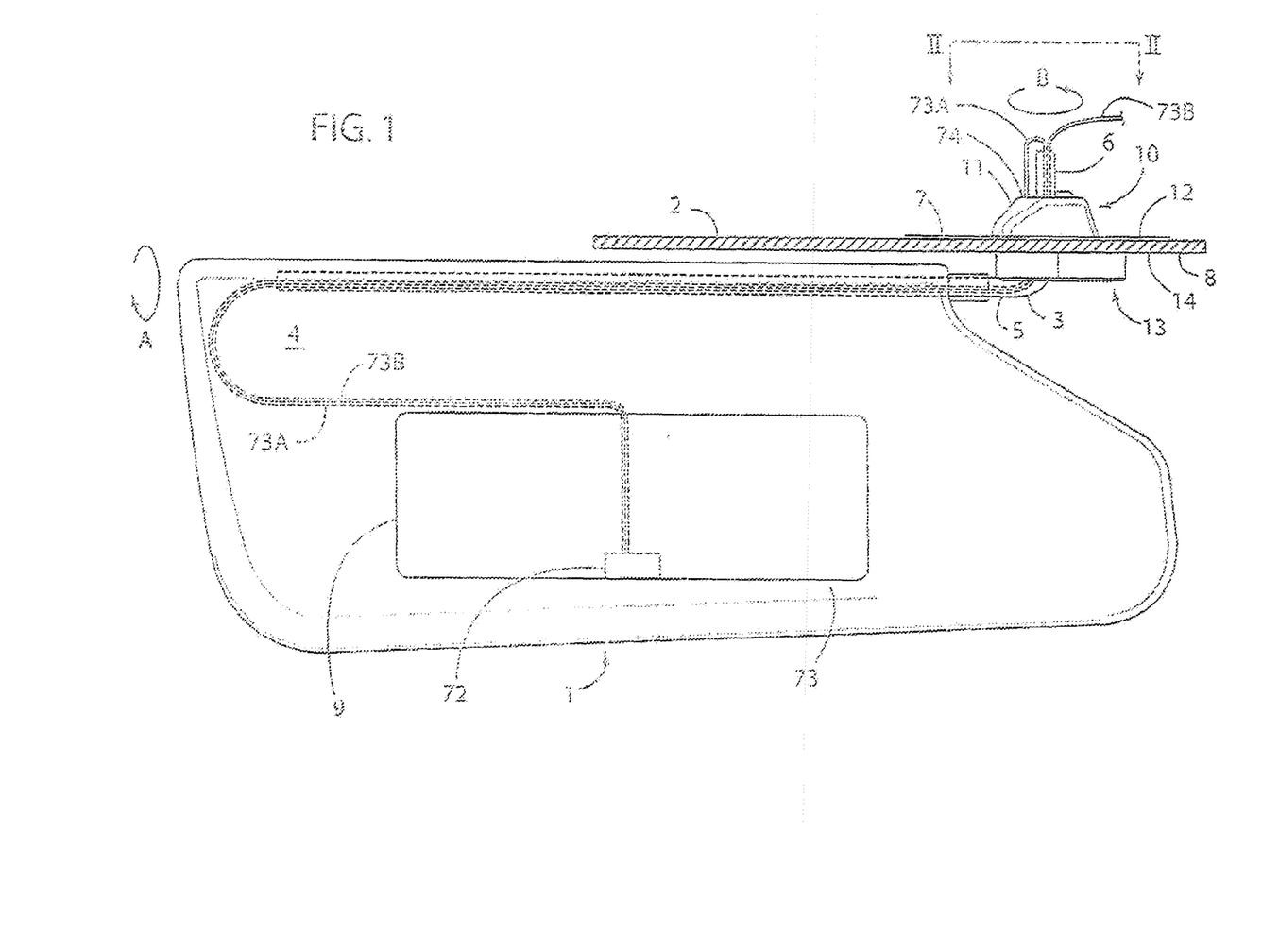
FIG. 1 shows a visor assembly according to one aspect of the present invention mounted to a panel of a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a visor assembly 1 is mounted to a vehicle roof panel or layer 2 via a support member or elbow 3 and bracket assembly 10. A visor body 4 may have a conventional plastic construction having a substantially hollow center portion. The visor body 4 may pivot about horizontal portion 5 as indicated by the arrow "A" of elbow 3, and may also rotate about vertically extending portion 6 as indicated by the arrow "B" of elbow 3 to provide adjustment. Although elbow 3 may have a variety of different constructions, in the illustrated example elbow 3 is a tubular metal member having an elongated internal cavity that can be utilized to route electrical wires 73A, 73B and the like to supply electrical power to electrical devices mounted to the visor body 4. The vehicle roof panel 2 includes an inner layer 7 that is typically made of sheet metal or the like. The inner layer 7 is covered by a sheet 8 that may include sound absorbing material and fabric or other cover material to provide a pleasing appearance for the interior of the vehicle. In the illustrated example, the visor body 4 comprises a molded plastic visor core that may be covered by padding, cloth, vinyl, or the like. The visor body 4 may, however, have a wide variety of constructions depending upon the requirements of a particular application.

Figure 2:
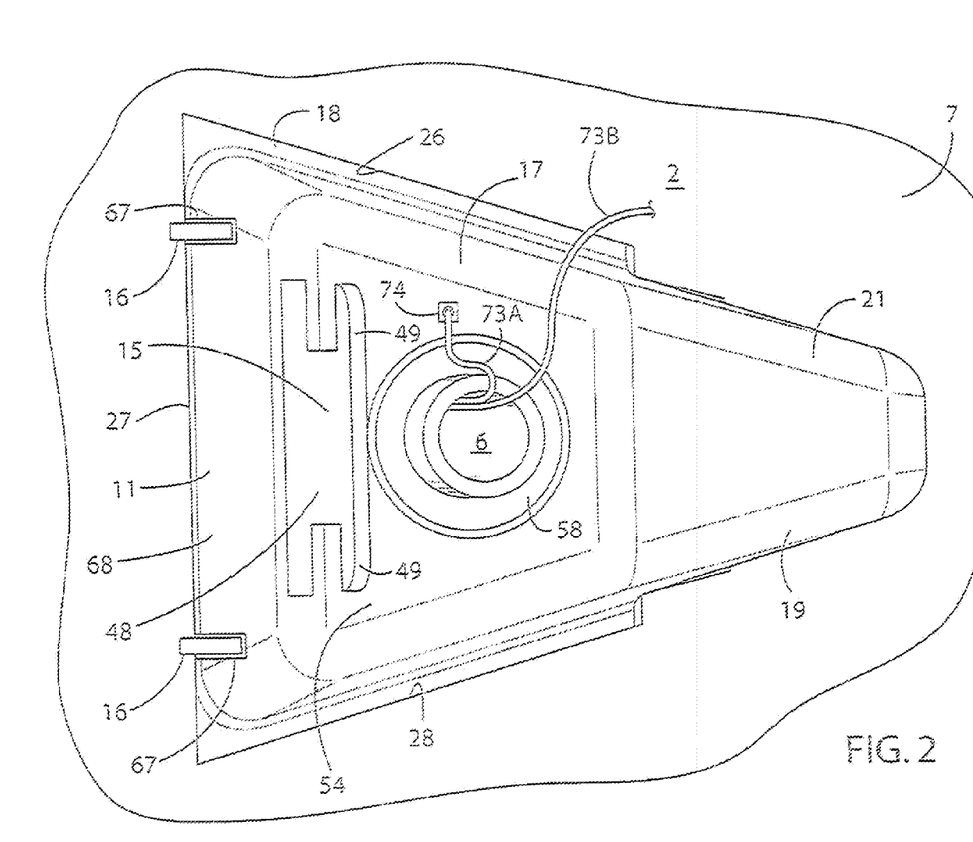
FIG. 2 is a partially fragmentary, top view of the visor assembly of FIG. 1 from above the vehicle panel.

Mounting bracket assembly 10 includes a cup-like metal housing 11 positioned on the upper side 12 of the roof panel 2, and a metal bracket member 13 positioned on a lower side 14 of roof panel 2. With further reference to FIG. 2, housing 11 has a main body portion 17 that extends through a trapezoidal opening 18 in the vehicle roof panel 2. A finger or extension 19 extends from the main body portion 17, and engagement surface 20 (see also FIG. 3) at the end 21 of finger 19 contacts the upper side 12 of roof panel 2. As described in more detail below, a foot member 15 includes a pair of tapered extensions 16 having lower edges 23 that engage the upper side 12 of roof panel 2.

Figure 4:
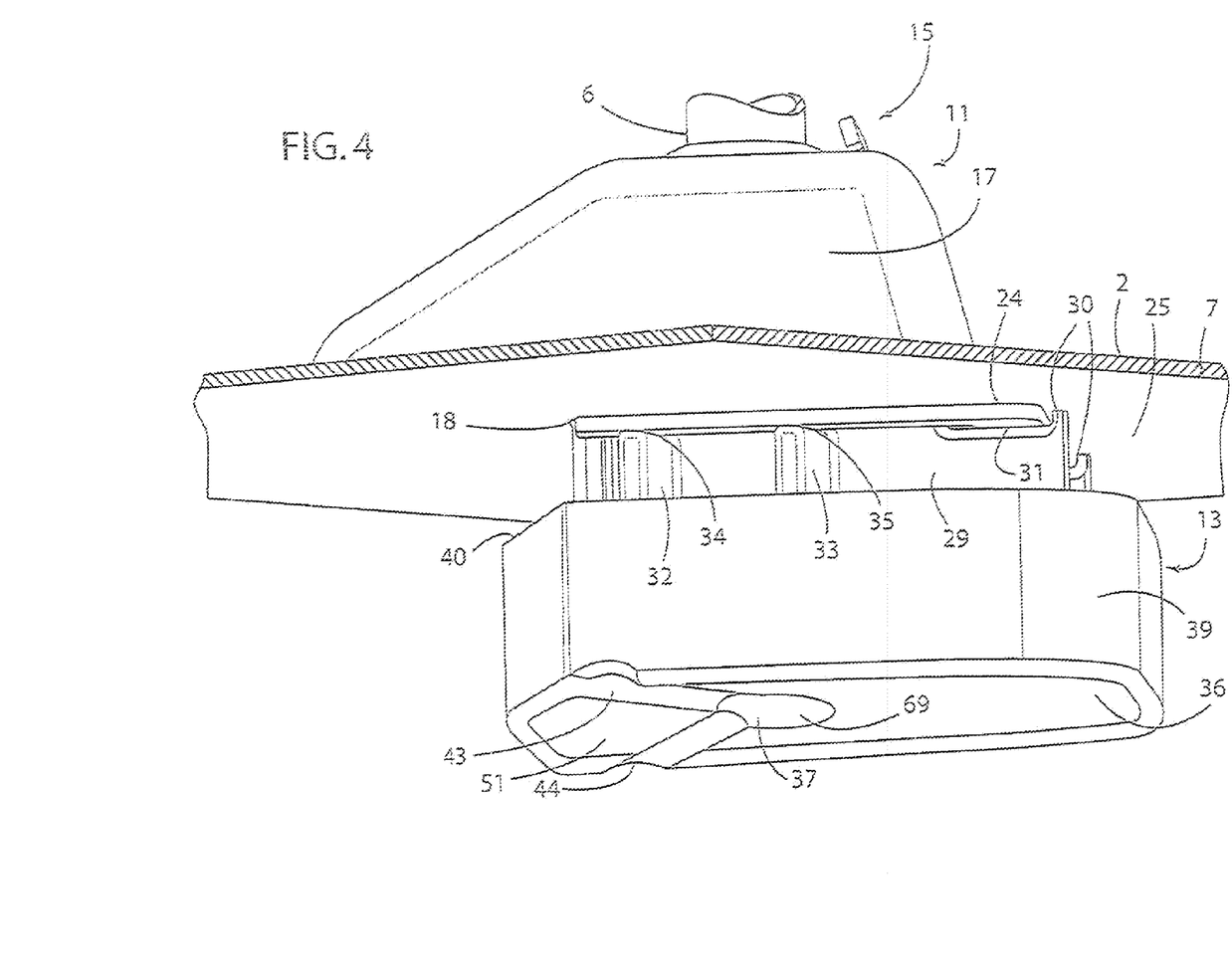
FIG. 4 is a partially fragmentary perspective view of a portion of the mounting arrangement.

With further reference to FIG. 4, housing 11 includes a flange 24 that engages the lower side 25 of inner layer 7 of roof panel 2 adjacent the edges 26, 27 and 28 of trapezoidal opening 18 (see also FIG. 2) in roof panel 2. The flange 24 ensures that the housing 11 is properly seated/positioned at the opening 18. Bracket member 13 includes a pair of upwardly extending wall portions 29, each of which include an end 30 that contacts the lower side 25 of inner layer 7 of roof panel 2. The walls 29 also include a cutout portion 31 that provides clearance for flange 24. Gussets 32 and 33 (see also FIG. 5) extend outwardly from the wall 29, and the upper ends 34 and 35 of gussets 32 and 33, respectively, abut the flange 24 of housing 11. The bracket 13 is symmetrical, such that the bracket 13 includes a pair of walls 29, and gussets 32 and 33 on opposite sides of the bracket 13. Bottom wall 36 of bracket member 13 includes grooves or channels 43 and 44 that extend outwardly from opening 37. When assembled, the vertical portion 6 of elbow 3 extends through opening 37, and the horizontal portion 5 (not shown in FIG. 4) may be positioned in groove 43 or in groove 44. The vertical portion 6 of elbow 3 rotates in opening 37, and grooves 43 and 44 provide a detent to retain the visor body 4 at the desired angular position adjacent the windshield or adjacent a side window. In the illustrated example, the grooves 43 and 44 are at about one hundred and ten degrees apart. However, the angle may be greater or smaller if required for a particular application. As discussed in more detail below, horizontal portion 5 of elbow 3 is biased towards bottom wall 36 and into grooves 43 and 44, such that horizontal portion 5 of elbow 3 tends to remain seated in groove 43 or 44. The detents provided by grooves 43 and 44 retain the visor in the end positions, and the smooth surface 51 between grooves 43 and 44 permits movement of the visor with relatively small applied force. Bracket member 13 may be made of a polymer material having a relatively low coefficient of friction to facilitate sliding of portion 5 of elbow 3 on surface 51 as the visor is moved between a position adjacent a vehicle windshield and a position adjacent a vehicle side window.

Figure 5:
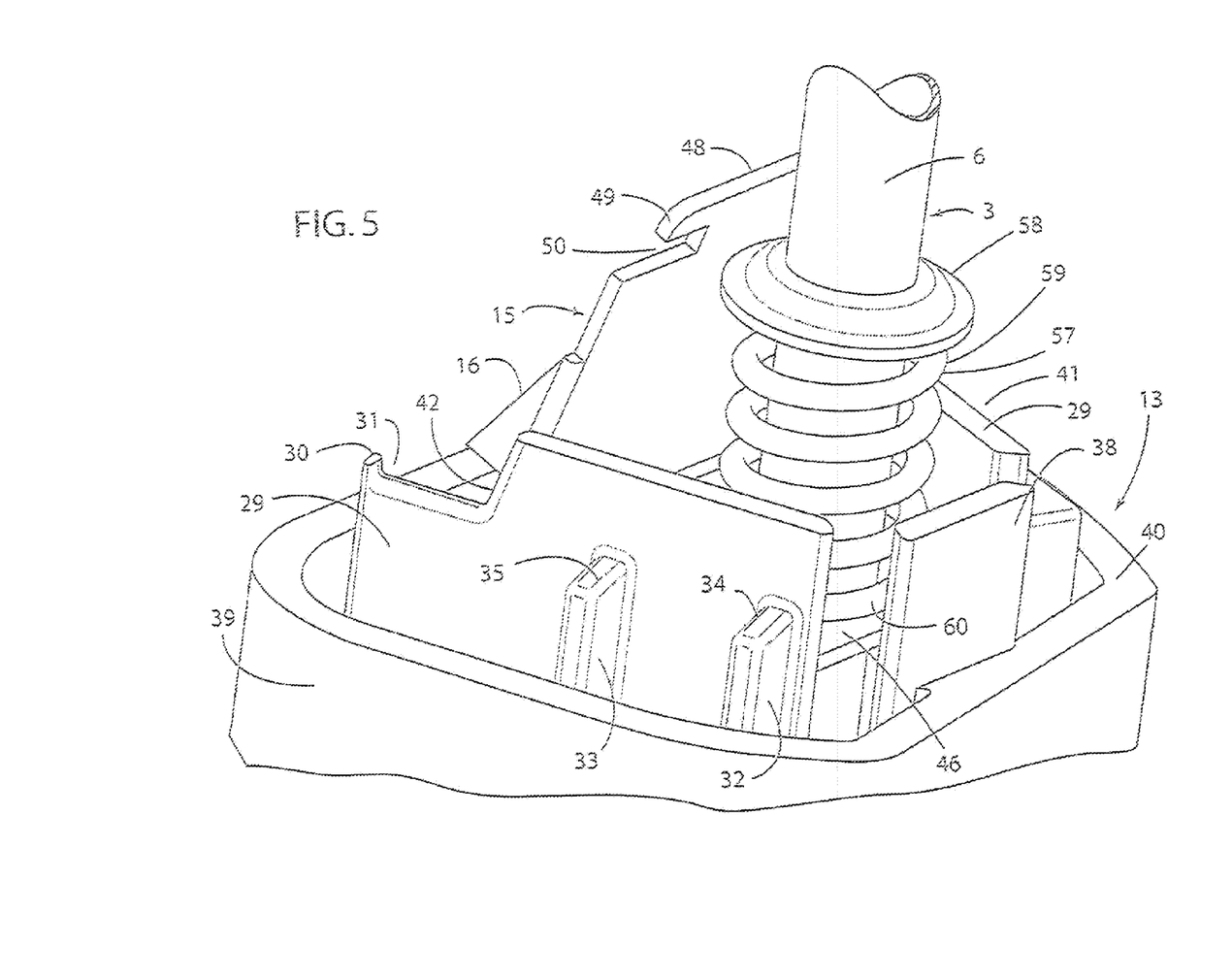
FIG. 5 is a partially fragmentary perspective view of a portion of the mounting assembly wherein the housing is removed.
Figure 6:
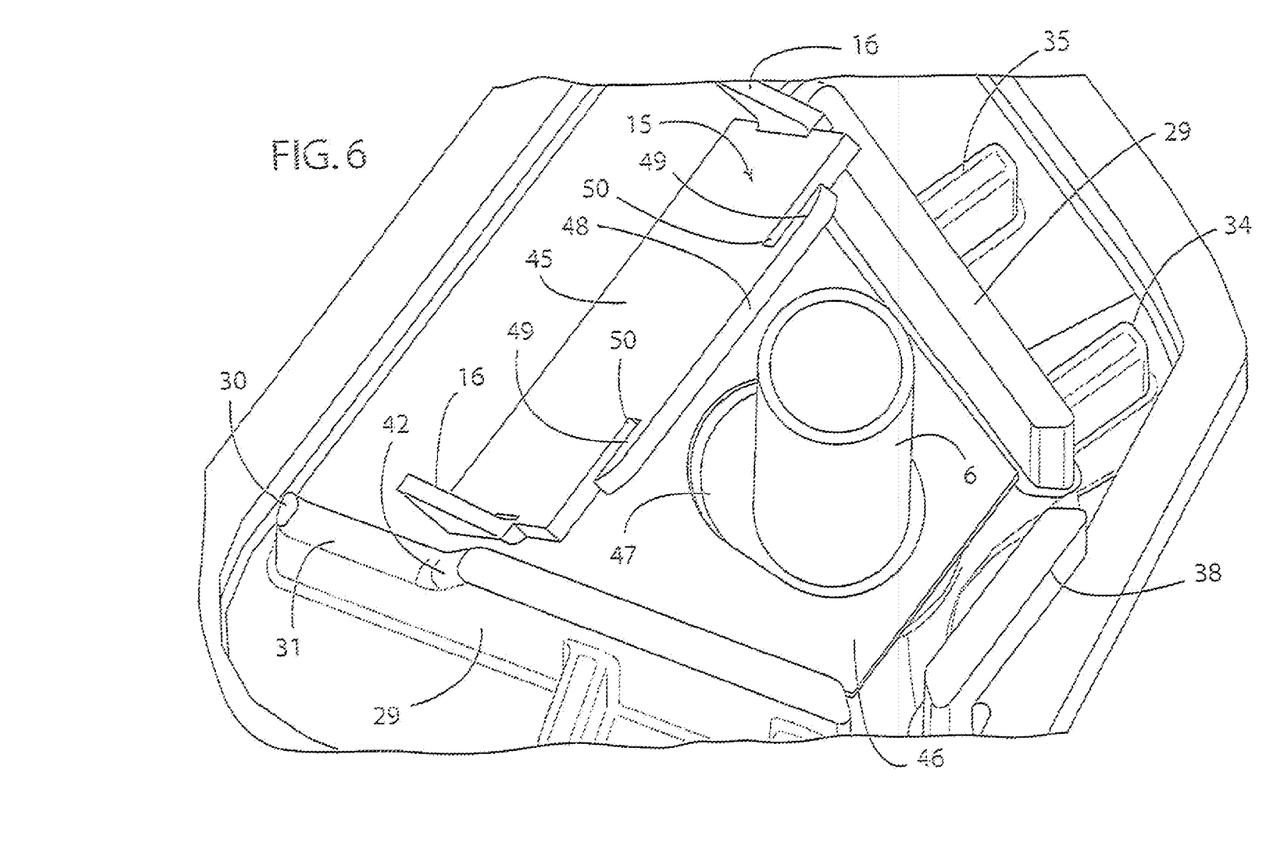
FIG. 6 is a partially fragmentary perspective view of a portion of the mounting assembly wherein the housing is removed.

With reference to FIG. 5, in addition to the walls 29, bracket 13 also includes a wall 38 that extends upwardly. Bracket 13 also includes an outer peripheral wall 39 that extends around the outside of bracket 13, and terminates at an upper edge 40. With reference back to FIG. 4, when the mounting bracket assembly 10 is installed, the edge 40 of wall 39 is spaced apart from the lower side 25 of inner layer 7 of vehicle roof panel 2. The edge 40 abuts or is positioned immediately adjacent to the sound insulating sheet 8 (FIG. 1) to provide a finished appearance. It will be understood that the layer 8 is not shown in FIG. 4 for clarity. The housing 11 has a generally hollow construction with a uniform side wall thickness and a trapezoidal lower opening that closely receives side walls 29 and 38 of bracket 13. The upper portions 41 of side walls 29 are received within the housing 11, and edge 42 of upper portion 41 fits closely against the inner side of the housing 11. Thus, the side walls 29 and 38 position the bracket 13 relative to the housing 11.

The foot member 15 includes an upwardly extending portion 45, and a horizontally extending lower portion 46, such that foot member 15 is generally L-shaped. The tapered extensions 16 extend outwardly from the upwardly extending portion 45 in a direction opposite the horizontally extending portion 46. The horizontally extending portion 46 includes an elongated opening 47 therethrough, and the vertically extending portion 6 of elbow 3 extends through the opening 47 when assembled. The upwardly extending portion 45 of foot member 15 includes a T-shaped upper portion 48 including outwardly extending portions 49, and slots 50. With reference back to FIGS. 2 and 3, when assembled, the T-shaped portion 48 of foot member 15 extends through a T-shaped opening 53 in the upper side wall 54 of housing 11. As discussed in more detail below, the foot member 15 pulls the housing 11 towards the bracket 13.

With reference to FIG. 5, a coil spring 57 is disposed on the upwardly extending portion 6 of elbow 3. The upper end 59 of spring 57 bears against a retaining clip 58, and a lower end 60 of coil spring 57 bears against the horizontally extending portion 46 of foot member 15. The retaining clip 58 includes teeth or the like (not shown) that engage the vertically extending portions 6 of elbow 3, such that forces from the coil spring 57 on clip 58 are transmitted to the vertical portions 6 of elbow 3. Coil spring 57 generates a force on foot member 15 tending to pull the housing 11 towards the bracket member 13, thereby connecting the visor to the vehicle roof panel 2. The force acting on the roof panel is distributed around opening 18 by housing 11 and foot member 15 to thereby secure the visor assembly 1 to the vehicle roof in a very rigid/stiff and strong manner.

With reference back to FIG. 1, visor 1 may include a flip-open mirror 9 with one or more electrical devices such as lights 72 that are turned on by a switch or other suitable device in a known manner. Alternately, mirror 9 and/or lights 72 and/or other electrical devices may be fixed to visor body 4 in a conventional manner (i.e. not flip-open). Wires 73A and 73B supply power from the vehicle electrical system (not shown) to light 72, and extend from light 72 through visor body 4 and through elbow 3 to a position above the vehicle roof layer 2. Several of the components of mounting bracket assembly or arrangement 10 are made of an electrically conductive metal material or the like that contacts the sheet metal 7 and thereby electrically connects at least part of bracket assembly 10 to sheet metal 7. Sheet metal 7 may form an electrical ground for the vehicle's electrical system. With further reference to FIG. 2, ground wire 73A may be electrically connected to housing 11 at pad or connector 74, and power line 73B may be routed to the electrical system of the vehicle. Alternately, if elbow 3 is made of metal or other electrically conductive material, ground wire 73A may be electrically connected to elbow 3 inside visor body 4. Elbow 3 thereby provides an electrical ground attachment through housing 11 and/or other conductive bracket components. Thus, ground wire 73A can be electrically connected to the vehicle ground by installing bracket assembly 10 to the vehicle roof 2 with housing 11 and other conductive components of bracket assembly 10 contacting an electrically conductive roof component.

Figure 7:
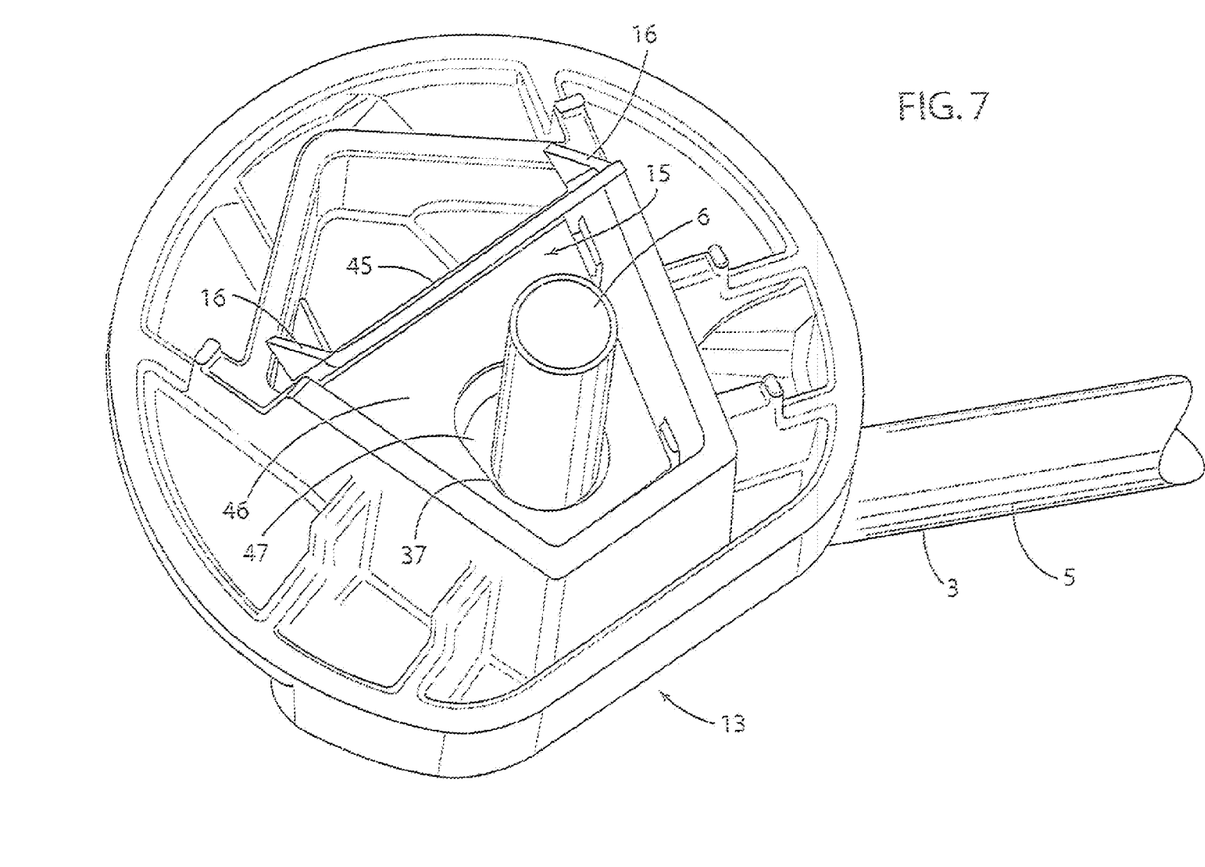
FIG. 7 is a partially fragmentary perspective view of a portion of the mounting arrangement during assembly.

With further reference to FIG. 7, during assembly, the bracket 13 is first placed on elbow 3 by inserting the vertically extending portion 6 of elbow 3 through opening 37 of bracket 13. The foot member 15 is then positioned on the bracket 13, with the vertical portion 6 of elbow 3 extending through the elongated opening 47 of foot member 15.

Figure 8:
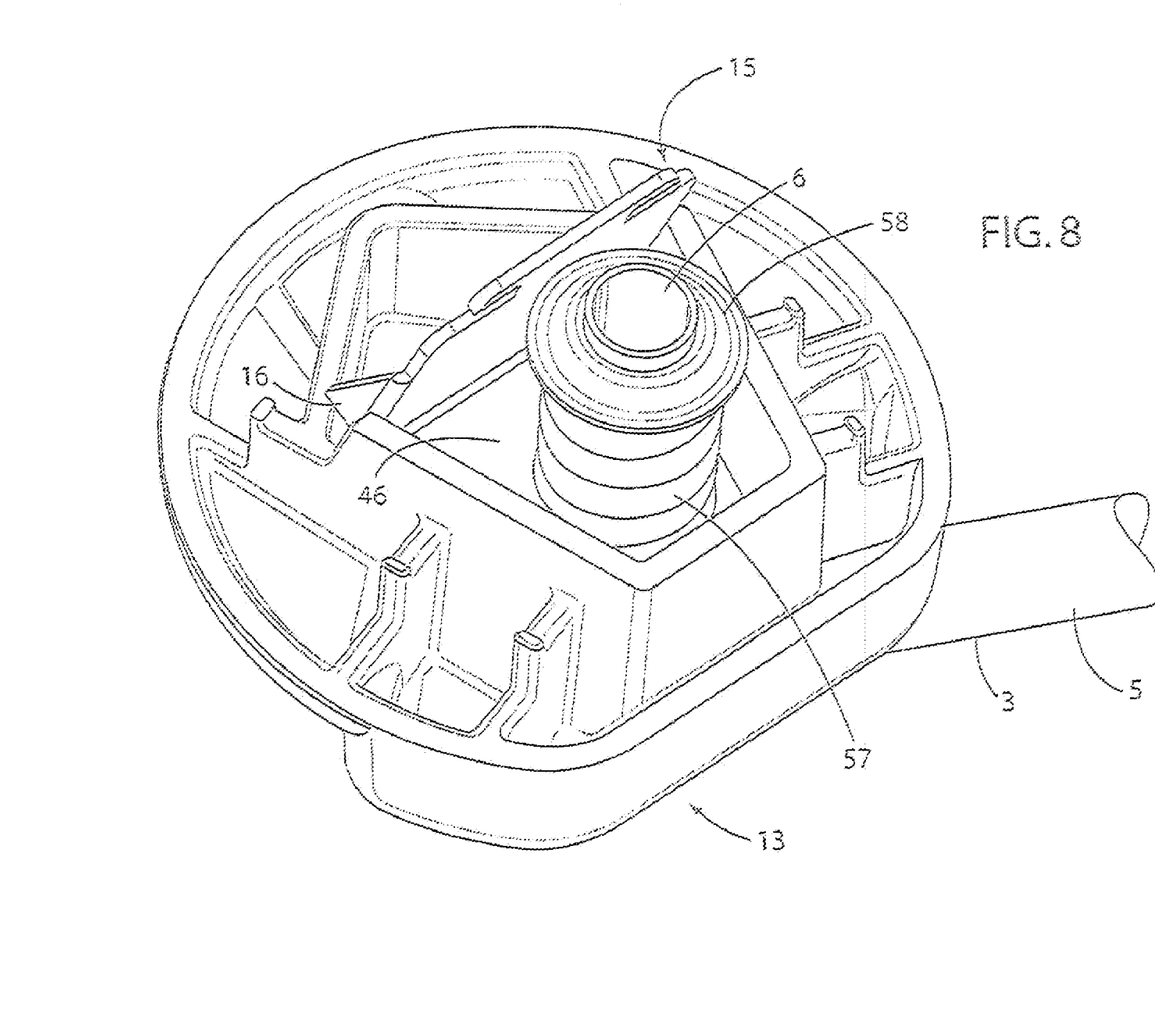
FIG. 8 is a partially fragmentary perspective view of a portion of the mounting arrangement during assembly.

With further reference to FIG. 8, coil spring 57 is then positioned on the vertically extending portion 6 of elbow 3, and retaining clip 58 is positioned on the vertically extending portion 6 to retain the coil spring 57 and compress spring 57 to preload spring 57. Clip 58 includes teeth or the like (not shown) that permit clip 58 to slide onto vertically extending portion 6, but prevent movement in the opposite direction. The coil spring 57 pushes upwardly against clip 58 and downwardly against the horizontally extending portion 46 of foot member 15. Spring 57 thereby tends to pull foot member 15 and bracket 13 downwardly towards the bracket member 13. With reference back to FIG. 4, spring 57 biases horizontal portion 5 of elbow 3 into lower surface 36 of bracket member 13.

Figure 3:
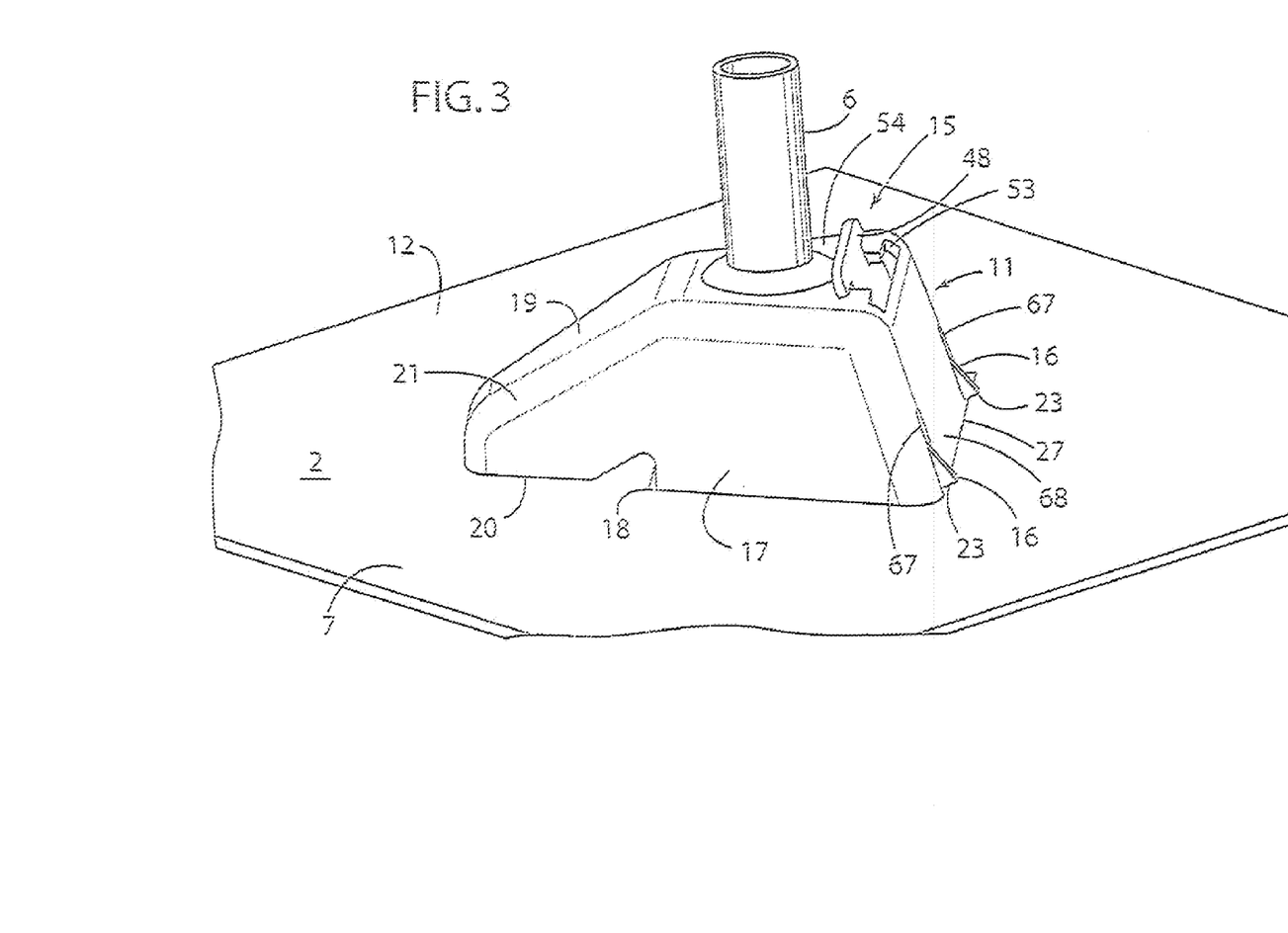
FIG. 3 is a partially fragmentary perspective view of the upper portion of the visor mounting arrangement.
Figure 9:
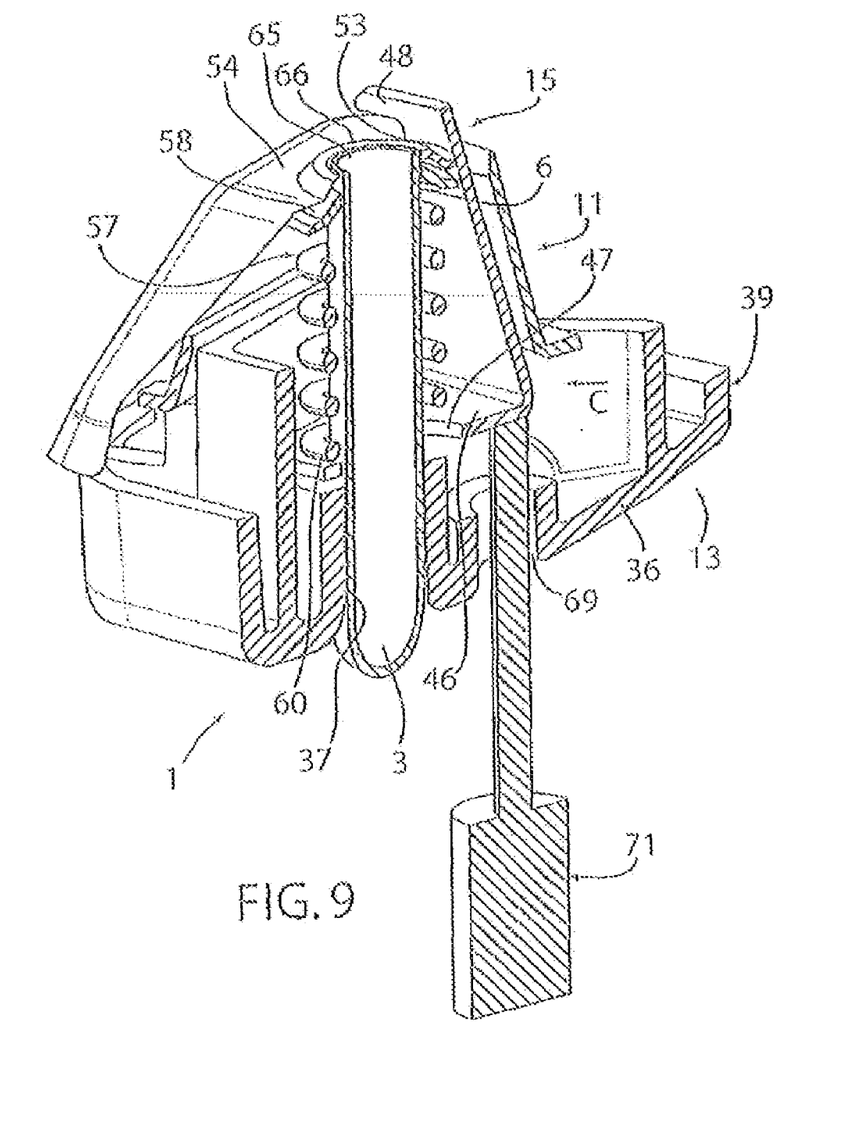
FIG. 9 is a cross-sectional view of the mounting arrangement in the assembled state prior to installation to a vehicle panel.

With further reference to FIG. 9, the housing 11 is then assembled by inserting the upper T-shaped portion 48 of foot member 15 through T-shaped opening 53 in the upper side wall 54 of housing 11. Also, the upper end 65 of vertical portion 6 of elbow 3 may extend through opening 66 in upper side wall 54 of housing 11. When the housing 11 is installed, the tapered extensions 16 extend through slotted openings 67 in side wall 68 of housing 11 (see also FIGS. 2 and 3). Because the lower end 60 of spring 57 pushes on the horizontal portion 46 of foot 15, the foot 15 is pushed downwardly. With reference to FIGS. 2 and 3, the extensions 49 of T-shaped upper portion 48 of foot member 15 push downwardly on the upper side wall 54 of housing 11 adjacent the T-shaped opening 53 in housing 11. Because the opening 47 in horizontally extending portion 46 of foot 15 is elongated, the foot member 15 can rotate about the upper end 48 at the point of contact between the outwardly extending portions 49 and the upper side wall 54 of housing 11 to permit movement of tapered extensions 16 during installation and removal of visor 1 from roof panel 2. Also, because the spring pulls the elbow 3 upwardly into contact with bracket 13, and the foot 15 also pulls downwardly on housing 11 due to the force generated by coil spring 57, the visor assembly 1 illustrated in FIG. 9 is held together as an assembly without the need for threaded fasteners or the like.

The bracket 13 includes an opening 69 in the bottom wall 36 of bracket 13. A tool 71 such as a screwdriver or the like can be inserted into the opening 69 into engagement with the horizontally extending portion 46 of foot 15. Tool 71 can be utilized to remove the visor assembly 1 from the vehicle roof panel 2, and may also be utilized to assist during installation of the visor assembly 1 to the vehicle roof panel 2. The tool 71 can be used to shift the horizontally extending lower portion 46 of foot member 15 in the direction of the arrow "C" to thereby disengage tapered extensions 16 from the upper side 12 of inner layer 7 of vehicle roof panel 2. As discussed above, the opening 47 is oblong, thereby permitting side-to-side movement of horizontal portion 46 of foot member 15 relative to the vertical extending portion 6 of elbow 3.

Figure 10:
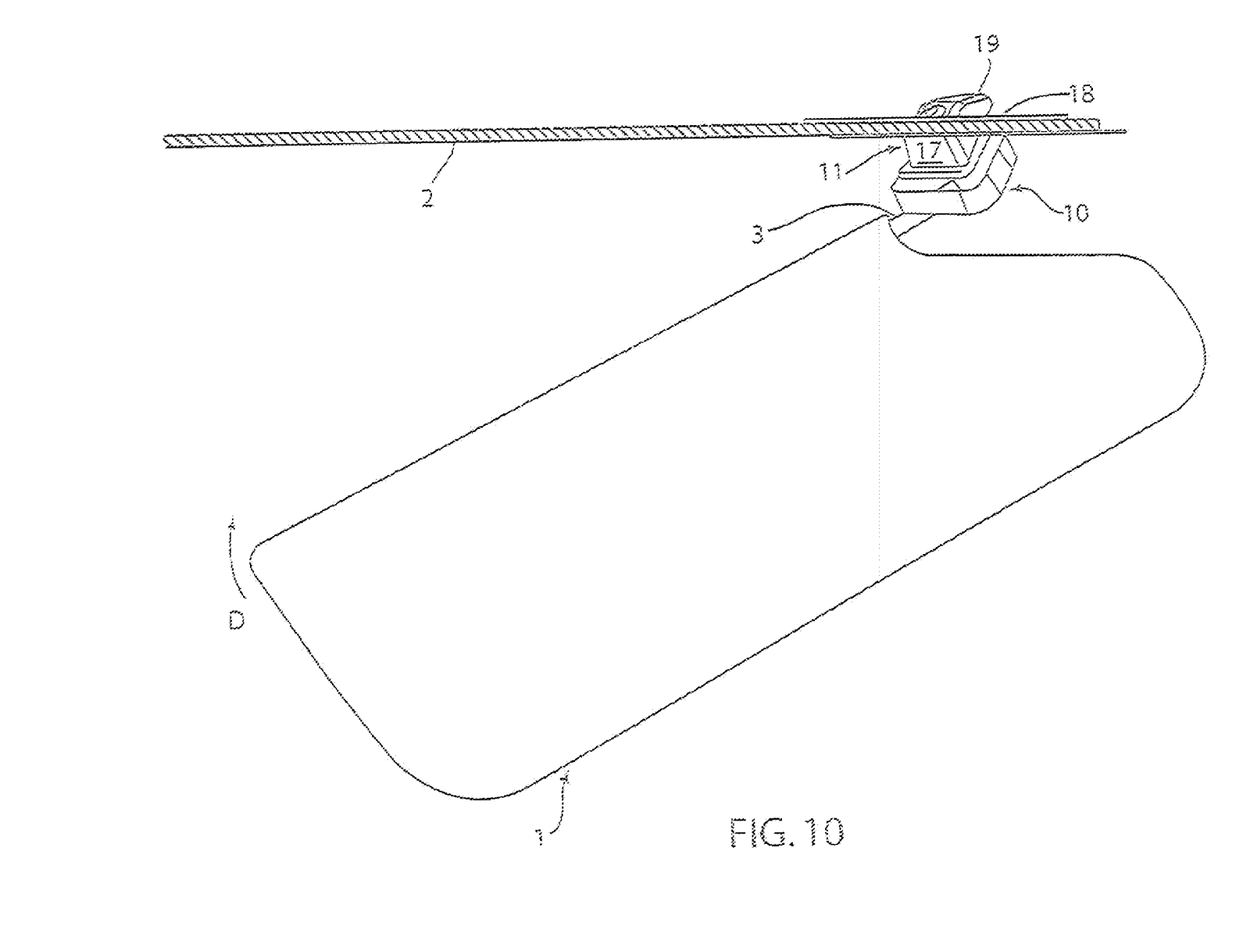
FIG. 10 is a perspective view showing installation of the visor assembly to a vehicle panel.

With further reference to FIG. 10, after the mounting arrangement or assembly 10 is attached to the elbow 3, the visor assembly 1 is installed to the vehicle roof panel 2. The finger 19 of housing 11 is inserted into the trapezoidal opening 18, and the visor assembly 1 is then rotated as indicated by the arrow "D" to bring the main body portion 17 of housing 11 through the trapezoidal opening 18. The visor body 4 and elbow 3 provide significant leverage that permits rotation of the visor in the direction of the arrow D with application of relatively little force. As the housing 11 slides through the opening 18, the tapered extensions 16 (see also FIG. 3) of foot member 15 are pushed inwardly by the side edge 27 of trapezoidal opening 18. When the visor body 1 is brought to the installed position illustrated in FIG. 1, the tapered extensions 16 snap outwardly due to the force of coil spring 57 to thereby secure the visor assembly 1 to the vehicle roof panel 2. When bracket assembly 10 is installed, one or more metal components contact metal roof layer 7 or electrically conductive vehicle component, such that the ground wire 73A is electrically grounded to the vehicle structure without requiring additional routing of wires, electrical connections, or the like. If required, a tool 71 (FIG. 9) may be utilized to shift the horizontally extending lower portion of foot member 15 to retract the tapered extensions 16. Also, the tool 71 may be used to detach the visor assembly 1 from the roof panel 2 by engaging the foot member 15 with the tool 71 and shifting the tapered extensions 16 inwardly, out of engagement with the upper side 12 of inner layer 7 of roof panel 2.

The mounting bracket assembly 10 of the present invention provides a quick and easy arrangement for securing a visor assembly to a roof panel or the like of a vehicle, without use of conventional threaded fasteners or the like.

In the foregoing description, it will be readily appreciated by those skilled in the art that modifications may be made to the invention without departing from the concepts disclosed herein. For example, a wide variety of materials may be utilized to fabricate the various visor components described in detail above. Such modifications are to be considered as included in the following claims, unless these claims by their language expressly state otherwise.

The invention claimed is:
1. A visor for vehicles, comprising:
 a visor body;
 a support member extending from the visor body and including a generally horizontal portion and a generally vertical portion, the generally horizontal and vertical portions together defining an L-shaped portion;

a mounting assembly configured to connect the support member to a vehicle roof, the mounting assembly including:
a bracket having an opening therethrough, the vertical portion of the support member extending through the opening;
a housing having a main body portion engaging the vertical portion of the support member, the housing including a first transversely extending portion configured to engage an upper side of a sheet of material to which the visor is to be attached, the housing further including a second transversely extending portion configured to engage a lower side of a sheet of material to which the visor is to be attached;
a foot member having an upper end engaging the housing, and a retaining structure configured to engage an upper side of a sheet of material to which the visor is to be attached;
a spring engaging the support member and biasing the support member upwardly, the spring engaging the foot member and biasing the foot downward such that the housing is biased towards the bracket.

2. The visor of claim 1, wherein:
the second transversely extending portion of the housing comprises a flange extending around a lower portion of the housing.

3. The visor of claim 1, wherein:
the housing is hollow, and defines an upper surface having an opening therethrough, and wherein the vertical portion of the support member extends through the opening.

4. The visor of claim 1, wherein:
the vertical portion of the support member includes a stop; and
the spring comprises a coil spring that is disposed around the vertical portion of the support member and engages the stop and thereby pushes upwardly on the support member.

5. The visor of claim 1, wherein:
the horizontal portion of the support member engages the bracket and biases the bracket towards the housing.

6. The visor of claim 1, wherein:
the upper end of the foot member has a catch structure that engages the housing and pulls the housing towards the bracket.

7. The visor of claim 6, wherein:
the foot member includes an upwardly-extending portion and a lower portion that extends transversely from the upwardly extending portion in a first direction, and wherein the retaining structure comprises at least one barb-like member that extends in a second direction that is different than the first direction.

8. The visor of claim 7, wherein:
the lower portion of the foot member extends around the vertical portion of the support member, and wherein:
the spring engages the lower portion of the foot and pushes downwardly on the foot.

9. The visor of claim 8, wherein:
the housing includes a T-shaped opening having a relatively wide portion and a relatively narrow portion, and wherein the upper end of the foot member includes a pair of oppositely extending members that can be inserted through the relatively wide portion of the opening and shifted to engage a surface of the housing adjacent the relatively narrow portion of the opening.

10. The visor of claim 1, including:
an electrically-powered device attached to the visor body; and wherein:
the electrically-powered device is electrically connected to the mounting assembly to ground the electrically-powered device to the mounting assembly.

11. In a vehicle of the type having a sheet of material forming an interior roof and a visor mounted to an opening in the sheet of material, the improvement comprising:
a visor body;
a support member extending from the visor body;
a mounting bracket assembly, comprising:
an upper member configured to engage an upper and lower surfaces of the sheet of material adjacent the opening;
a lower member that is resiliently biased towards the upper member to capture a portion of the sheet of material between the upper member and the lower member and wherein:
the bracket assembly retains the support member and visor body to the interior roof.

12. The vehicle of claim 11, including:
a spring operably engaging the support member and biasing the support member and the lower member upwardly.

13. The vehicle of claim 12, wherein:
the spring operably engages the upper member and biases the upper member downwardly.

14. The vehicle of claim 13, including:
a foot member engaging the spring to bias the foot member downwardly, the foot member having an edge that engages an upper surface of the sheet of material, and wherein the foot member engages the upper member and pulls the upper member downwardly.

15. The vehicle of claim 14, wherein:
the upper member comprises a housing having a main body portion having an opening therethrough that receives a portion of the support member, the housing having a finger extending from the main body portion and engaging an upper surface of the sheet of material adjacent the opening in the sheet of material.

16. The vehicle of claim 15, wherein:
the support member defines an upper portion that includes a stop, and wherein the spring comprises a coil spring disposed around the upper portion and engaging the stop to push the support member upwardly.

17. The vehicle of claim 16, wherein:
the support member engages the lower member and pushes the lower member towards the housing.

18. A method of attaching a visor to a vehicle interior panel having an opening therethrough, the interior panel defining inner and outer surfaces, the method comprising:
providing a visor having a body and a support member extending from the body;
providing a bracket member having an opening therethrough;
providing a housing member having a body portion defining a cavity and a finger extending from the body portion;
providing a foot member having an upper portion and a lower portion configured to extend around the support member;
providing a coil spring;
providing a clip configured to engage the support member;
inserting the support member through the opening in the bracket member;

positioning the foot member adjacent the bracket member with the lower portion of the foot member extending around the support member;

positioning the coil spring around the support member with an end of the spring engaging the lower portion of the foot member;

positioning the clip on the support member to retain the coil spring between the clip and the lower portion of the foot member;

positioning the body portion of the housing adjacent the bracket member with the upper portion of the foot member in the cavity;

inserting the finger of the housing into the opening in the vehicle interior panel;

shifting the housing to insert the body portion of the housing into the opening in the vehicle interior panel and position the finger at the inner surface of the interior panel.

19. The method of claim 18, wherein:

the foot member includes a retaining structure; and including:

engaging the retaining structure against the inner surface of the vehicle interior panel to retain the visor to the vehicle interior panel.

20. The method of claim 19, wherein:

the coil spring pushes downwardly on the lower portion of the foot member; and the upper portion of the foot member engages the housing and pulls the housing towards the bracket.

21. The method of claim 20, wherein:

the spring pushes against the clip to bias the support member upwardly; and the support member pushes the bracket member towards the housing member.

* * * * *